United States Patent [19]
Raleigh et al.

[11] Patent Number: 5,272,013
[45] Date of Patent: Dec. 21, 1993

[54] ARTICLES MADE OF HIGH REFRACTIVE INDEX PHENOL-MODIFIED SILOXANES

[75] Inventors: William J. Raleigh, Rensselaer, N.Y.; James A. Campagna, Pittsfield, Mass.; Michael A. Lucarelli, Ballston Spa, N.Y.

[73] Assignee: General Electric Company, Waterford, N.Y.

[21] Appl. No.: 934,046

[22] Filed: Aug. 21, 1992

[51] Int. Cl.⁵ .................................. B32B 9/04
[52] U.S. Cl. .................................. 428/447; 528/43; 528/29; 528/31; 525/474; 351/159
[58] Field of Search .............. 428/447; 528/43, 29, 528/31; 525/474; 351/159

[56] References Cited

U.S. PATENT DOCUMENTS

| | | | |
|---|---|---|---|
| 3,419,634 | 12/1968 | Vaughn, Jr. | 260/824 |
| 3,419,635 | 12/1968 | Vaughn, Jr. | 260/824 |
| 3,996,187 | 12/1976 | Travnicek | 524/588 |
| 4,114,993 | 9/1978 | Travnicek | 351/160 |
| 4,430,235 | 2/1984 | Chu et al. | 252/49.6 |
| 4,718,748 | 1/1988 | Broer et al. | 350/96.3 |
| 4,738,509 | 4/1988 | Broer et al. | 350/96.34 |
| 4,745,169 | 5/1988 | Sugiyama et al. | 528/43 |
| 4,871,816 | 10/1989 | Percec et al. | 525/393 |
| 4,952,657 | 8/1990 | Riding et al. | 528/27 |

Primary Examiner—John C. Bleutge
Assistant Examiner—Margaret W. Glass

[57] ABSTRACT

Articles of manufacture having improved refractive index made of phenol-modified siloxanes are described. One use of these articles is as optical lenses.

2 Claims, No Drawings

ARTICLES MADE OF HIGH REFRACTIVE INDEX PHENOL-MODIFIED SILOXANES

The present invention relates to phenol-modified siloxanes. More particularly, the present invention relates to phenol-modified aryl-modified siloxanes having a high refractive index.

BACKGROUND OF THE INVENTION

Siloxanes having high refractive index are useful in many applications, including coatings for optical devices, such as contact lenses. Travnicek, U.S. Pat. No. 4,114,993 discloses a method for coating contact lenses comprising applying to the lens a coating of (i) a polymer of a dimethyl siloxane, a diphenyl siloxane or phenyl-methyl siloxane or both, and a vinyl siloxane; (ii) a polymer of a dimethyl siloxane, a diphenyl siloxane or phenyl-methyl siloxane or both, and an alkyl hydrogen siloxane; and (iii) 5 to 20% fume silica.

Other disclosures of silicones for use in optical glass applications, include the Broer et al. patents, U.S. Pat. Nos. 4,718,748 and 4,738,509, which describe an optical glass fiber having a synthetic resin cladding in which the first layer of the synthetic resin cladding is formed from a curable synthetic resin composition comprising a curable polysiloxane composition.

It has now been discovered that a new class of high refractive siloxanes are provided by incorporating aryl-modified siloxy units into a relatively low refractive index phenol-modified siloxane. These novel phenol-modified aryl-modified siloxanes surprisingly exhibit excellent optical properties making them suitable for use in many applications requiring materials having a high refractive index.

SUMMARY OF THE INVENTION

According to the present invention there is provided a siloxane having high refractive index comprising a siloxane of the general formula:

$$M'D_xD'_yM'$$

wherein M' represents a phenol-modified dialkyl siloxy group or an aryl-modified dialkyl siloxy group, D represents a dialkyl siloxy group and D' represents a phenol-modified alkyl siloxy group or an aryl-modified alkyl siloxy group, provided said siloxane comprises both phenol-modified and aryl-modified siloxy groups, x is above about 1 and y is above about 1.

Also according to the present invention there is provided a process for preparing the aryl-modified phenol-modified siloxanes of the present invention comprising: (a) preparing a hydride silicone fluid of the general formula: $M^HD_xM^H$ wherein $M^H$ represents an dialkyl hydrogen siloxy, D represents a dialkyl siloxy and x is above about 1; (b) reacting the hydride silicone fluid of step (a) with a phenol to produce a phenol-modified siloxane of the general formula: $M^{Ph}D_xM^{Ph}$ wherein $M^{Ph}$ represents a phenol-modified dialkyl siloxy, and D and x are as defined above; (c) reacting the phenol-modified siloxane of step (b) with alkyl hydrogen cyclic siloxanes to produce a phenol-modified hydride silicone fluid of the general formula: $M^{Ph}D_xD^H_yM^{Ph}$ wherein $D^H$ represents an alkyl hydrogen siloxy, y is above about 1, and $M^{Ph}$, D and x are as above-defined; and (d) reacting the phenol-modified hydride silicone fluid of step (c) with an aromatic compound to produce a aryl-modified phenol-modified siloxane having high refractive index of the general formula: $M^{Ph}D_xD^{Ar}_yM^{Ph}$ wherein $D^{Ar}$ represents aryl-modified alkyl siloxy, and $M^{Ph}$, D, x and y are as above-defined.

The present invention also provides an alternative process for preparing the aryl-modified phenol-modified siloxanes of the present invention comprising: (a) preparing a hydride silicone fluid of the general formula: $M^HD_xD^H_yM^H$ wherein $M^H$ represents a dialkyl hydrogen siloxy, D represents a dialkyl siloxy; $D^H$ represents an alkyl hydrogen siloxy; x is above about 1; and y is above about 1; (b) reacting the hydride silicone fluid of step (a) with a relatively small amount of a phenol to produce a phenol-modified hydride siloxane of the general formula: $M''D_xD''_yM''$ wherein each $M''$ independently represents either a dialkyl hydrogen siloxy or a phenol-modified dialkyl siloxy; each $D''$ independently represents either an alkyl hydrogen siloxy or a phenol-modified alkyl siloxy, provided there are both hydrogen siloxy groups and phenol-modified siloxy groups in the phenol-modified hydride siloxane; and D, x and y are as defined above; and (c) reacting the phenol-modified hydride siloxane fluid of step (c) with an aromatic compound to produce a aryl-modified phenol-modified siloxane having high refractive index of the general formula: $M'D_xD'M'$ wherein each $M'$ independently represents a phenol-modified dialkyl siloxy group or an aryl-modified dialkyl siloxy group; each $D'$ independently represents a phenol-modified alkyl siloxy group or an aryl-modified alkyl siloxy group, provided the aryl-modified phenol-modified siloxane comprises both phenol-modified and aryl-modified siloxy groups, and D, x and y are as above defined.

The present invention further provides a method of improving the refractive index of a phenol-terminated siloxane comprising (i) reacting a phenol-terminated siloxane of the formula $M^{Ph}D_xM^{Ph}$ wherein $M^{Ph}$ represents a phenol-modified dialkyl siloxy, D represents a dialkyl siloxy group and x is above about 1; with alkyl hydrogen cyclic siloxanes to produce a phenol-terminated hydride silicone fluid of the general formula: $M^{Ph}D_xD^H_yM^{Ph}$ wherein $D^H$ represents an alkyl hydrogen siloxy, y is above about 1, and $M^{Ph}$, D and x are as above-defined; and (ii) reacting the phenol-terminated hydride silicone fluid of step (i) with an aromatic compound to produce an aryl-modified phenol-terminated siloxane having high refractive index of the general formula: $M^{Ph}D_xD^{Ar}_yM^{Ph}$ wherein $D^{Ar}$ represents an aryl-modified alkyl siloxy, and $M^{Ph}$, D, x and y are as above-defined.

DETAILED DESCRIPTION OF THE INVENTION

The present invention provides novel aryl-modified phenol-modified siloxanes having excellent refractive index properties. These novel siloxanes are useful in producing articles having improved optical qualities.

The aryl-modified phenol-modified siloxanes have the general formula

$$M'D_xD'_yM'$$

wherein M', D, D', x and y are as defined above.

In preferred embodiments of the present invention M' represents a phenol dialkyl siloxy of the general formula

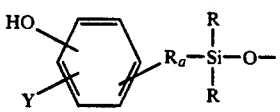

where $R_a$ represents an alkenyl group, preferably of from 2 to about 12 carbon atoms, Y is selected from hydrogen, hydrocarbyl, hydrocarbyloxy and halogen, and R is an alkyl group of from 1 to about 10 carbon atoms. A particularly preferred phenol dialkyl siloxy useful in the practice of the present invention is a eugenol-modified dialkyl siloxy of the formula:

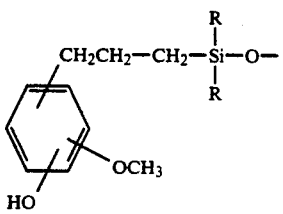

where R is methyl.

The dialkyl siloxy units, D, of the present invention represent those of the general formula $R_2SiO$—wherein R is an alkyl of 1 to 10 carbon atoms, preferably methyl.

The preferred aryl modified alkyl siloxy groups of the resent invention are those where $D^{Ar}$ is of the general formula $RR^{Ar}SiO$—wherein R is an alkyl of 1 to 10 carbon atoms, preferably methyl; and $R^{Ar}$ represents a monovalent aryl or aralkyl radical, including but not limited to phenyl, methylphenyl, benzyl, tolyl, naphthyl, phenylethyl, styryl, α-methyl styryl, xylyl and the like. Preferably $R^{Ar}$ is a phenylisopropyl group or a phenethyl group.

The values of x and y may vary greatly depending upon the desired end viscosity of the polymers of the present invention. Typically, x is above about 1, preferably from about 1 to about 1000, more preferably from about 1 to about 500, and most preferably from about 5 to about 50. Typically, y is above about 1, preferably from about 1 to about 2000, more preferably from about 1 to about 1000, and most preferably from about 10 to about 100.

The aryl-modified phenol-modified siloxanes of the present invention provide improved refractive properties. In preferred embodiments, the total aromatic weight content, including the aryl and phenol, of the aryl-modified phenol-modified siloxanes of the present invention is above about 50 weight percent. Thus, in preferred embodiments of the present invention, the ratio of the values of y to x are above about 2:1.

The aryl-modified phenol-modified siloxanes of the present invention typically have a refractive index of greater than about 1.5000 and can easily be formed into articles of excellent optical quality by forming methods known to those of ordinary skill in the art.

In a preferred embodiment, the aryl-modified phenol-modified siloxanes are prepared by a method generally comprising the steps of hydride fluid synthesis; phenol hydrosilation; phenol hydride fluid synthesis; and aryl hydrosilation.

Accordingly, phenol end-capped siloxanes are synthesized by first preparing a hydride fluid from suitable precursors, such as alkyl tetramers, in the presence of an acid catalyst, such as carbon black or sulfuric acid or mixtures thereof, according to acid equilibration methods known to those skilled in the art. The acid equilibration is then followed by hydrosilation with a phenol, such as eugenol, in the presence of a platinum catalyst, concluded with light-ends devolatilization. Any of the known hydrosilation catalysts may be used in the hydrosilation reaction. These are well described in the patent literature, including, e.g., Lamoreaux, U.S. Pat. No. 3,220,972, Karstedt, U.S. Pat. Nos. 3,715,334, 3,775,452 and 3,814,730; and Ashby, U.S. Pat. Nos. 4,421,903 and 4,288,345.

Phenol hydride fluids are then synthesized from the phenol-end capped siloxanes by standard acid equilibration techniques. The phenol hydride fluids are then reacted with an aromatic compound following conventional hydrosilation techniques. Any monovalent aromatic compound may be used in the aromatic hydrosilation reaction, including, but not limited to styrene compounds such as α-methyl styrene, styrene; benzene; toluene; xylene; naphthene; cumene; mesitylene; etc. A particularly useful monovalent aromatic compound tic is α-methyl styrene.

It is also contemplated that the aromatic hydrosilation reaction may be performed in the presence of solvents, such as toluene, or may be run neat (without solvent) as in other conventional hydrosilation reactions.

Alternatively, the aryl-modified phenol-modified siloxanes of the present invention may be prepared by a process generally comprising the steps of hydride fluid synthesis; phenol hydrosilation; and aryl hydrosilation.

In this embodiment, a hydride fluid of the formula

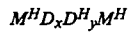

$$M^H D_x D^H_y M^H$$

where $M^H$, D, $D^H$, x and y are as defined above, by methods known to those of ordinary skill in the art. The hydride fluid is then reacted by hydrosilation with a relatively small amount of a phenol, i.e., an amount less than needed to react with all the hydride sites on the hydride fluid, to produce a phenol-modified hydride siloxane of the general formula

$$M'' D_x D''_y M''$$

wherein each M'' independently represents either a dialkyl hydrogen siloxy or a phenol-modified dialkyl siloxy; each D'' independently represents either an alkyl hydrogen siloxy or a phenol-modified alkyl siloxy; provided the phenol-modified hydride siloxane has both phenol-modified and hydride-modified siloxy groups; and D, x and y are as above defined.

The phenol-modified hydride siloxane is then reacted with an aryl in a hydrosilation reaction to produce the aryl-modified, phenol-modified siloxanes of the present invention.

DESCRIPTION OF THE PREFERRED EMBODIMENTS

The following examples illustrate the present invention. They are not to be construed to limit the scope of the claims in any manner whatsoever.

EXAMPLE 1

Hydride Fluid Synthesis

A hydride fluid of the general formula $M^H D_{10} M^H$ is prepared. 847 grams of silicone tetramer and 153 grams of tetramethyl disiloxane are added to a vessel and mixed. To the vessel is then charged 1 grams of sulfuric acid and 5 grams of carbon black. The contents of the vessel is heated to 50° C. and held at that temperature for 3 hours. The mixture is then heated to 100° C. for 1 hour and 5 grams of MgO is added to the mixture. The resulting mixture is then filtered through Celite ® 545.

EXAMPLE 2

Eugenol Hydrosilation 727 grams of $M^H D_{10} M^H$ fluid of Example 1 is charged to a vessel. Separately, a mixture of 0.04 grams of platinum-based catalyst (Karstedt, U.S. Pat. No. 3,715,334) and 273 grams of eugenol is prepared. The Eugenol/platinum catalyst is then added to the $M^H D_{10} M^H$ fluid at a rate to control the exotherm at less than 100° C. The reaction mixture is mixed and checked for reaction completion. At the completion of the reaction, the light ends are stripped from the mixture at 150° C. under 20 mm vacuum. The product has an average structure of $M^{Eu} D_{10} M^{Eu}$.

EXAMPLE 3

Eugenol Hydride Fluid Synthesis 1000 grams of the $M^{Eu} D_{10} M^{Eu}$ from Example 2 is added to a vessel along with 1000 grams of methyl hydrogen cyclics (containing less than 0.1% of hexamethyl disiloxane). The vessel is then charged with 2 grams of sulfuric acid and 10 grams of carbon black. The contents of the vessel is heated to 50° C. and held at that temperature for 3 hours. The mixture is then heated to 100° C. for 1 hour and 10 grams of MgO is added to the mixture. The resulting mixture is then filtered through Celite ® 545 and contains a product having the average structure $M^{Eu} D_{10} D^H_{20} M^{Eu}$.

EXAMPLE 4

Phenyl Hydrosilation 504 grams of the $M^{Eu} D_{10} D^H_{20} M^{Eu}$ is added to a vessel. To this is added a mixture of 496 grams of α-methyl styrene and 0.03 grams of platinum catalyst in 1000 grams of toluene at a rate to control the exotherm to below 100° C. The reaction mixture is stirred to completion and stripped to 150° C. pot temperature under 20 mm vacuum with an $N_2$ purge to remove siloxane light-ends and toluene. The final product has the average structure of $M^{Eu} D_{10} D^{Ph}_{20} M^{Eu}$.

EXAMPLE 5

The procedures of Examples 1 to 4 are repeated to prepare a final product having the average structure of $M^{Eu} D_{50} D^{Ph}_{100} M^{Eu}$.

EXAMPLES 6-7

The products of Examples 5 and 4, respectively, are tested for viscosity and refractive index. The results along with compositional data are set forth in Table 1 below.

TABLE 1

| Example | 6[a] | 7[b] |
|---|---|---|
| Composition, wt. % | | |
| Eugenol | 1.5 | 6.9 |
| α-Methyl styrene | 53.7 | 49.6 |
| Total aromatic | 55.2 | 56.5 |
| Properties | | |
| Viscosity, centistokes | 2938 | 588 |
| Refractive Index @ 25° C. | 1.5080 | 1.5040 |

[a] = $M^{Eu} D_{50} D^{Ph}_{100} M^{Eu}$
[b] = $M^{Eu} D_{10} D^{Ph}_{100} M^{Eu}$

From the data presented in Table 1, it can be seen that eugenol-terminated siloxanes having significantly improved refractive index can be prepared according to the present invention. It is noted that typical refractive index values for polydimethylsiloxane is 1.4035 at 25° C., and for eugenol-terminated siloxanes of the formula $M^{Eu} D_{10} M^{Eu}$ (Example 2) is on the order of 1.449 at 25° C.

The above-mentioned patents are hereby incorporated by reference.

Many variations of the present invention will suggest themselves to those of ordinary skill in the art in light of the above-detailed description. For example, aromatics other than α-methyl styrene can be reacted with the eugenol hydride fluid to obtain compositions of the present invention. Further, the chain lengths, i.e., x and y, can vary widely within the preferred ranges. It is also contemplated that the hydrosilation with the aromatic compound can be run neat, i.e., without solvent added. All such obvious modifications are within the full intended scope of the appended claims.

We claim:

1. An article of manufacture having improved refractive index comprising a composition comprising a siloxane of the general formula:

$$M'D_xD'_yM'$$

wherein each M' independently represents a phenol-containing dialkyl siloxy group or an aryl-containing dialkyl siloxy group, D represents a dialky siloxy group and each D' independently represents a phenol-containing alkyl siloxy group or an aryl-containing alkyl siloxy group, provided said siloxane comprises both phenol-containing and aryl-containing siloxy groups, x is above about 1 and y is above about 1.

2. An article of manufacture as defined in claim 1, which is an optical lens.

* * * * *